Dec. 26, 1967  F. O. BARTHOLD  3,360,710
CONVERTER—ALTERNATING CURRENT OR DIRECT CURRENT
TO ALTERNATING CURRENT, WITH CONTINUOUSLY
VARIABLE ADJUSTMENT OF OUTPUT
FREQUENCY AND VOLTAGE
Filed June 8, 1964  2 Sheets-Sheet 1
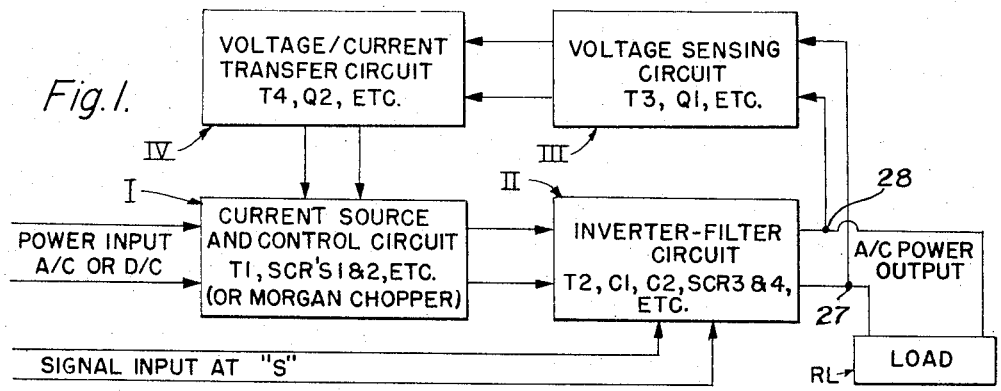
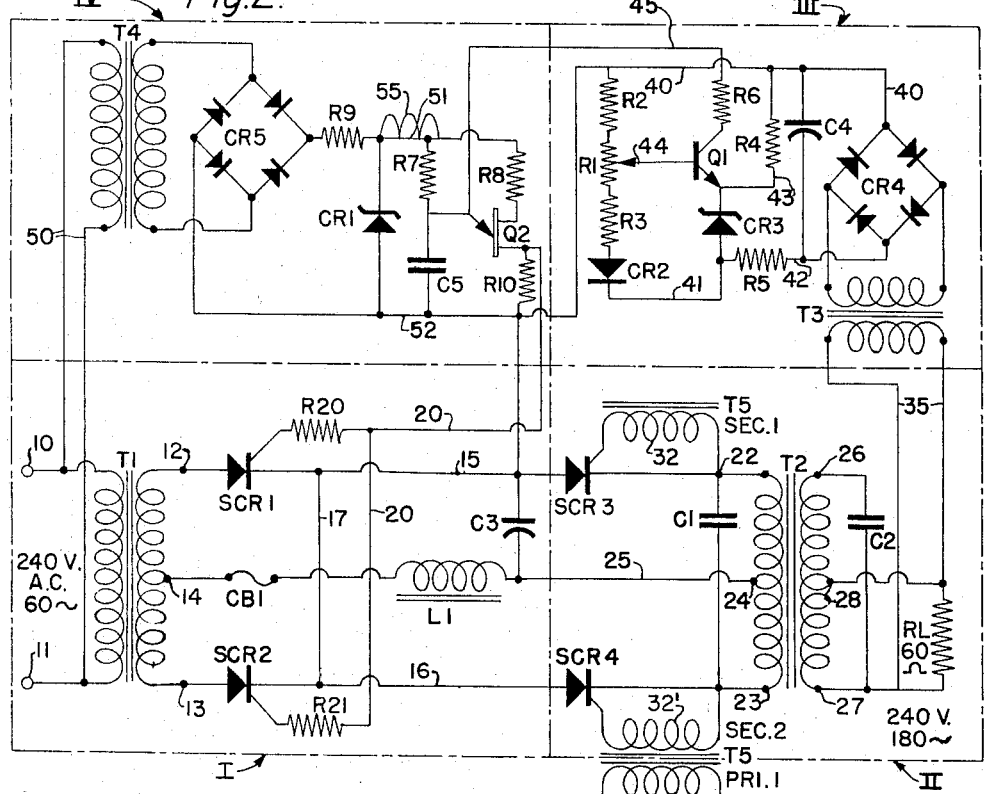
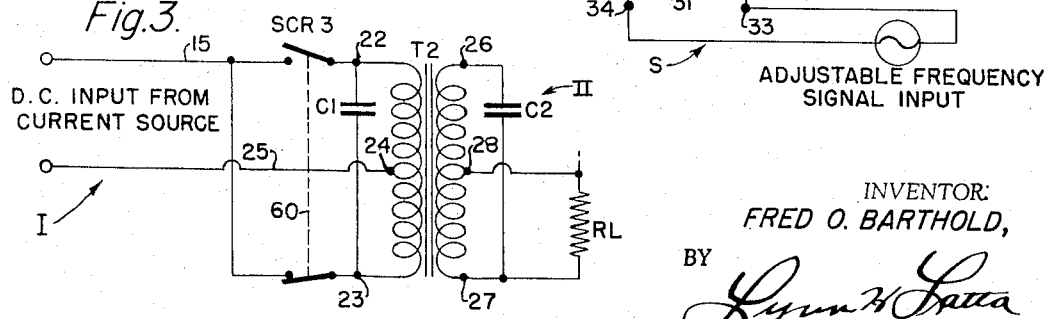
INVENTOR:
FRED O. BARTHOLD,
BY
ATTORNEY.

Dec. 26, 1967  F. O. BARTHOLD  3,360,710
CONVERTER—ALTERNATING CURRENT OR DIRECT CURRENT
TO ALTERNATING CURRENT, WITH CONTINUOUSLY
VARIABLE ADJUSTMENT OF OUTPUT
FREQUENCY AND VOLTAGE
Filed June 8, 1964  2 Sheets-Sheet 2

INVENTOR:
FRED O. BARTHOLD,
BY
*Lynn H. Latta*
ATTORNEY.

United States Patent Office 3,360,710
Patented Dec. 26, 1967

3,360,710
CONVERTER—ALTERNATING CURRENT OR DIRECT CURRENT TO ALTERNATING CURRENT, WITH CONTINUOUSLY VARIABLE ADJUSTMENT OF OUTPUT FREQUENCY AND VOLTAGE
Fred O. Barthold, 1100 S. Parkway Trail, Topanga, Calif. 90290
Filed June 8, 1964, Ser. No. 373,286
3 Claims. (Cl. 321—9)

This invention relates to converters and has as its basic object to provide a converter of high efficiency for developing output currents of widely varying frequency and voltage. The invention contemplates a converter in which the output frequency may be varied over a range extending at least from 10 c.p.s. to 5,000 c.p.s., and in which the output power capacity may be varied over a range at least from 50 watts to 75,000 watts, within established design goals.

Toward the attainment of the foregoing general object, the inventions aims to provide a converter wherein:

(1) Output is of sinusoidal waveform.
(2) Frequency conversion is attained at power levels from 50 watts to 75,000 watts.
(3) Conversion efficiency is high, on the order of 90%.
(4) There is provided output voltage regulation at plus or minus 1% with plus or minus 10% input voltage or frequency.
(5) Output voltage regulation is attained at plus or minus 1% from no load to full rated load.
(6) Complete protection against short-circuiting is provided.
(7) There is continuously variable output voltage, from zero to rated value.
(8) There is low harmonic distortion (less than 3% at full load) and low envelope distortion (less that .1%) of the output waveform.
(9) The foregoing is attained in an ambient temperature range of from minus 60° C. to 100° C.
(10) Weight per kilowatt in a substantial conversion range (e.g. approximately 60 c.p.s. to 400 c.p.s.) is low, less than 50 pounds, no more than half the weight per kilowatt conversion capacity which exists in known devices now available on the market.
(11) From an input alternating current of 240 volts, 60 c.p.s., may be derived an output current of 240 volts, 180 c.p.s., 961 watts or an output current of equivalent wattage at other selected frequencies within a range up to 400 c.p.s.
(12) The inverter component of the apparatus, in which direct current is converted into the AC output, has network characteristics equivalent to a low-pass pi-type filter, which achieves a low harmonic-content sinusoidal output waveform, and in addition, eliminates the need for a commutating choke and thereby is a major contributing factor in the attainment of the high efficiency hereinbefore mentioned.
(13) The component inductance of the equivalent filter is derived through intentional high leakage design of the inverter transformer, i.e., a greater than normal physical displacement of the primary with respect to the secondary windings. Also, the invention utilizes coil forms such that relatively free movement of either coil is possible. The inductance parameter is at maximum with maximum separation.
(14) No magnetic shunt is employed in the transformer construction and thus major items of cost, weight and power loss (in the form of heat) are eliminated.

Other objects and advantages will become apparent in the ensuing specification and appended drawings in which:

FIG. 1 is a block diagram of a converter apparatus embodying my invention;
FIG. 2 is a more detailed diagram of the same;
FIG. 3 is a detail diagram of the inverter filter component of the circuit;
FIG. 4 is a schematic diagram of the equivalent of the inverter filter component circuit;
FIG. 5 is a schematic diagram of the wave forms of the input and output currents developed in the apparatus;
FIG. 6 is a sectional view of a transformer component of the apparatus; and
FIG. 7 is a sectional view of a modified form of transformer that may be used as an alternative.

General description of invention

Referring now to the drawings in detail and in particular to the block diagram of FIG. 1, my improved converter apparatus comprises, in general, a current source and control circuit component I adapted to be activated either by AC or DC power input, to rectify the AC input (where AC is used) and to develop a DC output which is delivered to an inverter-filter circuit component II. The inverter-filter circuit II is controlled (as to frequency) by a signal input component S and is operative to develop an AC power output which is delivered to the load $R_L$.

The power output is sampled (as to voltage amplitude) by a voltage sensing circuit component III which feeds back a DC current equivalent of the sensed voltage to a voltage-current transfer circuit component IV. Circuit IV senses changes in the current output of the sensing circuit III as a linear function of the changes in the output voltage amplitude of the power output. In response to variations in the current output of the sensing component III, the transfer circuit IV transmits a control signal to the current source unit I so as to effect a gating action in that unit.

Briefly, the operation of the apparatus is such that any increase in the power output amplitude or voltage will develop a corresponding increase in the DC control current delivered from the sensing circuit III. The increase in control current, affecting the transfer circuit IV, will result in a signal which, when transmitted to the control circuit I, will effect a decrease in the output of that unit as transmitted to the inverter-filter circuit II, such as to adjust the voltage amplitude of its power output back to the selected level.

The signal input component S functions to establish the frequency of operation of the inverter-filter circuit II, and therefore embodies means for adjusting frequency to any selected value. Also, the signal input S renders the inverter-filter circuit II operative in that it effects the gating action characteristic of the inverter in component II.

Detailed description

Figure 4:
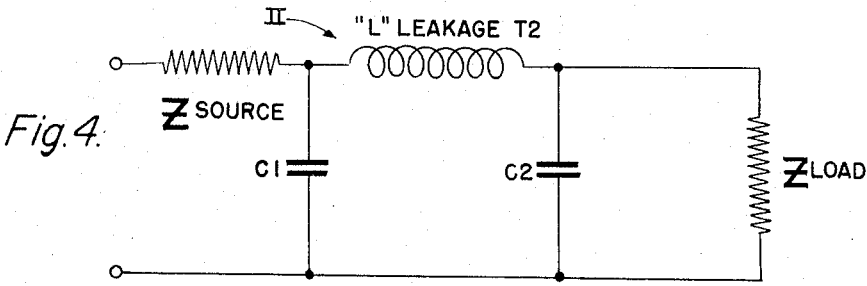

Referring now to FIG. 2, illustrating more of the detailed circuitry, the current source-control circuit I includes a power transformer T1 having a primary connected across a pair of input terminals 10 and 11 supplying current from a suitable source which may, for example, be a 60 cycle 240 volt AC current source as indicated; and having a secondary provided with end terminals 12 and 13 and a center tap 14. Transformer T1 is a conventional power transformer. For purposes of illustration, AC input power is described although substitution of a basic Morgan chopper for the phase-gated current control shown results in fundamentally identical performance from a DC input. Silicon controlled rectifiers SCR1 and SCR2 are connected to the terminals 12 and 13 respectively at their anode terminals, their cathode terminals being connected by conductors 15 and 16 to silicon controlled rectifiers SCR3 and SCR4 respectively in the inverter-filter circuit II. The conductors 15 and 16 are shunted by a conductor 17. The rectifiers SCR1, SCR2, SCR3 and SCR4 function as switching devices or gates. The gate terminals of the rectifiers SCR1 and SCR2 in the control circuit I are connected in parallel to a feedback signal conductor 20, with resistors R20 and R21 interposed in the branch connections from the feedback conductor 20 to the respective gate terminals. The anode terminals of rectifiers SCR3 and SCR4 are connected to the cathode terminals of the rectifiers SCR1 and SCR2 through the conductors 15 and 16, and the cathode terminals of the rectifiers SCR3 and SCR4 are connected to the end terminals 22 and 23 of the primary of a transformer T2 in the inverter-filter circuit II. The primary of transformer T2 has a center tap 24 which is connected through a conductor 25 to a choke coil L1 and a circuit breaker or fuse CB1 to the center of tap 14 of the secondary of transformer T1. Choke coil L cooperates with a capacitor C3 which is connected across the conductors 15 and 25 to provide a choke input filter which is effective to smooth out and eliminate substantially all ripple component from the input to transformer T2, thus providing a substantially pure DC input. For purposes of illustration, AC input power is described, although substitution of a basic DC chopper for the phase-gated current control shown results in fundamentally identical performance from a DC input. A Morgan chopper is indicated on the drawing as an example of a suitable type, though other choppers can be utilized.

Inverter-filter component II comprises, in addition to the transformer T2, a condenser C1 which connected across its primary terminals 22 and 23; a condenser C2 connected across its secondary terminals 26 and 27, and a center tap 28 which constitutes one of its output terminals, the terminal 27 being the other. The load $R_L$ is connected across the output terminals 27, 28 as indicated. By thus taking off the output from between the center tap and one end terminal, and connecting the capacitor C2 across the two end terminals, it becomes possible to utilize a much smaller capacitor in this portion of the circuit.

The inverter-filter component II further includes a small signal-isolation double-secondary transformer T5 the primary of which is shown at 31 in the signal input component S, and the two secondaries of which are shown at 32 and 32' in the component II. The two secondaries are connected as gate-cathode connections between the rectifiers SCR3 and SCR4 and the primary terminals 22 and 23 respectively of the transformer T2, thus being operative to control the gating action of the rectifiers SCR3 and SCR4 in response to the alternatively positive and negative pulses transmitted by the signal input component S. The signal input current is of low intensity and may, for example, be a 10 volt 180 cycle input.

Voltage-sensing feedback circuit III is activated through a signal transformer T3 the primary of which is connected by feedback conductors 35 across the output terminals 27, 28 of transformer T2. The secondary of transformer T3 delivers its output to the AC input terminals of a full wave rectifier bridge CR4. A filter capacitor C4 is connected across the output terminals of rectifier CR4. A temperature-compensated voltage divider comprising resistors R1, R2 and R3 and a diode CR2 in series with one another, is connected across a pair of conductors 40 and 41, the former being connected directly to the positive output terminal of rectifier CR4 and the conductor 41 being connected to the negative output terminal of rectifier CR4 through a resistor R5 and a conductor 42 in series, the conductor 42 being directly connected to one side of capacitor C4. Connected across the conductors 40 and 41 is a bias network comprising a Zener diode CR3, a resistor R4 and a connecting conductor 43 which is connected to the emitter of a transistor Q1 for establishing an operating bias thereon. The base of transistor Q1 is connected to the wiper 44 of a potentiometer having the resistor R1 as its resistance element and interposed between the resistors R2 and R3 to adjust the emitter-base bias of transistor Q1. The collector of transistor Q1 is connected through a resistor R6 to a conductor 45 leading to the emitter of a unijunction transistor Q2, which constitutes part of the transfer circuit IV.

Briefly reviewing the operation of feedback-sensing circuit III at this point, variations in the output of transformer T2 in inverter-filter circuit II will be sensed by rectifier CR4 which will deliver a DC output in the form of a correspondingly varying voltage across the voltage divider R1, R2, R3, CR2 to produce corresponding variations in the base-emitter bias on transistor Q1, the Zener diode CR3 providing a fixed reference bias on the emitter of the transistor. In response to the variations of the base-emitter bias on transistor Q1, corresponding variations in its collector current will be transmitted through the feedback output conductor 45 to the uni-junction Q2 of the transfer circuit IV to vary the operation thereof.

Transfer circuit IV receives its operating power through a small transformer T4 the primary of which is connected by conductors 50 across the 240 v. AC 60 cycle power input through terminals 10 and 11, and draws a small percentage of the input power. The secondary of transformer T4 is connected across the input terminals of a bridge rectifier CR5. A voltage divider network comprising a resistor R9 and a Zener diode CR1 in series is connected across the output terminals of rectifier CR5, with resistor R9 connected to the positive terminal and diode CR1 connected to the negative terminal. Voltage divider R9, CR1, in response to the DC output of rectifier CR5, provides a synchronizing voltage for the unijunction Q2, the common connecting terminal of resistor R9 and diode CR1 being connected through a conductor 51 to the base 2 resistor R8 of unijunction Q2 and the opposite side of diode CR1 being connected through a conductor 52 to the base 1 resistor R10 of unijunction Q2. A timing network comprising a resistor R7 and a capacitor C5 in series is connected across the conductors 51, 52 and functions to regulate the pulse-firing rate of unijunction Q2 in response to the voltage applied thereto.

The feedback conductor 20 is connected to the base 1 terminal of unijunction Q2 to transmit the output pulses thereof as control signals to the gates SCR1 and SCR2 of current source-control circuit I.

The rectifier CR5 delivers a full wave unfiltered output, indicated at 55, comprising a full series of half cycle pulses as indicated. In its operation, transfer circuit IV delivers through feedback conductor 20, as the output of unijunction Q2, a series of pulses that are synchronized with the input pulses 55 in the sense that their repetition rate is the same; but the instants of delivery of the output pulses are varied by retardation and advancement over a range of somewhat less than 180°, such retardation and advancement being controlled by a shunting current which is transmitted through feedback conductor 45 to timing network R7, C5 and appears in parallel with capacitor C5, thus in effect changing its time constant. The variations in the time constant of capacitor C5 result in the delaying or speeding up of the delivery of the output pulses of unijunction Q2 in relation to the intervals of reception of the input pulses 55.

The variably timed feedback pulses which are delivered to the gates SCR1, SCR2 are utilized to control the gating of the half cycles of output from transformer T1 so as to pass variable portions of those half cycles into the input of transformer T2 in inverter-filter component II. The proportion of a half cycle that is transmitted will depend upon the point on the wave form at which the feedback control pulse is received. At this point, the respective gate is opened to pass the remainder of the half cycle, the portion of the half cycle preceding the reception of the control pulse being blocked.

Signal input component S comprises a small dual-secondary transformer T5 having a primary 31 energized by a suitable adjustable-frequency source of alternating positive and negative low-power pulses, such as an oscillator or small alternating current generator 36 connected to input terminals 33 and 34 of the transformer. Transformer T5 also includes the two secondaries 32 and 32', shown in inverter-filter component II, in controlling relation to the gate terminals of silicon rectifiers SCR1 and SCR2.

Referring now to FIG. 3, which represents the inverter filter component II of the system diagrammatically in somewhat broader form than in FIG. 2, the SCR3 and SCR4 gating units are shown in this figure as simple switches, thus representing their basic function of switching the two sides of the inverter-filter circuit alternately to "on" and "off" conductive condition. The dotted line 69 schematically represents the symmetrical relationship existing between the triggering of the two gates, with one being on while the other is off and vice versa.

At this point it is noted that a particular accomplishment of the invention is the production of an essentially sinusoidal output across the load $R_L$ without the employment of the complex circuitry heretofore considered necessary to attain this result in an apparatus utilizing a conventional inverter or equivalent component. In a typical inverter circuit, the output of the inverter is essentially of square wave form and in order to convert this output into a sinusoidal or approximately sinusoidal wave form, it is necessary to utilize filter circuits embodying large capacities and inductances which must carry the full load current, with unavoidable efficiency losses occurring in the conversion.

In attaining this improved result, my invention is characterized particularly by the employment of a constant K, pi-type, low pass filter as an integral part of the inverter-filter component II, plus the use of a voltage to current feedback reference in the control of this pi-type filter circuit. That is to say, the regulatory action of the feedback components III and IV is one utilizing current variation responses to voltage variation signals fed back from the output terminals of the inverter-filter component II.

Referring now to FIG. 4, to illustrate the functioning of the filter-inverter circuit, there is shown therein the equivalent circuit for one side of the inverter-filter component shown schematically in FIG. 3. It is to be understood of course that the circuit illustrated in FIG. 4 does not exist as such in the inverter-filter component II. In FIG. 4, the DC input from component I is indicated as a high impedance by the legend "Z source," this being important for the reason that the pi-type filter operates as maximum efficiency in response to a high impedance DC input. The term "high impedance" as applied to the input, is used in a relative sense, to designate the ratio between the input impedance and the output impedance. Actually, the input impedance is low in absolute value.

The characteristic pi-type filter structure of the inverter unit II is illustrated by the arrangement of the capacitances C1 and C2 as the two legs of a pi arrangement in which the L leakage T2 bridges between these legs at one side thereof, and in which the output, designated as "Z" load is in parallel wtih the capacitor C2.

Figure 5:
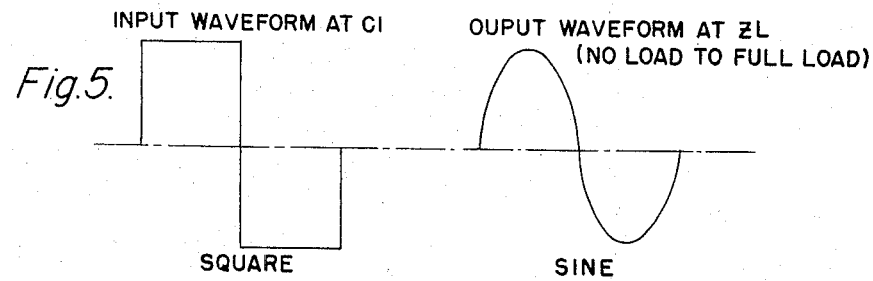

Referring now briefly to FIG. 5, the leftward half of the figure designates the essentially square wave form of the input voltage, and the sinusoidal form of the rightward half of the diagram designates the essentially sinusoidal output voltage waveform at "Z load" in FIG. 4.

Figure 6:
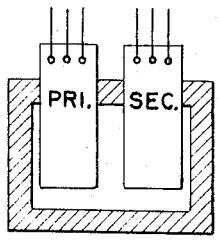
Figure 7:
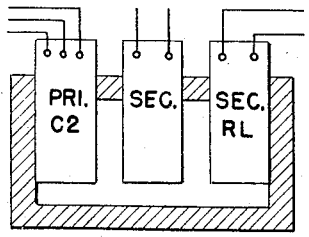

The component L of the equivalent filter is derived through intentional high leakage design of the inverter transformer, i.e. a greater than normal physical displacement of the primary with respect to the secondary windings. Although several construction techniques have this effect, the most flexible was found to be the L or C lamination with primary and secondary coils on the same leg as in FIG. 6. This permits the degree of adjustment of this L parameter to compensate for small variations in the values of C1 and C2. The coil forms selected are such that relatively free movement of either coil is possible. The L parameter is, of course, at maximum with maximum separation. It should be noted that, in addition to functioning as the series element of the equivalent low pass pi-type filter, this L component replaces the discrete inductance typically essential to proper commutation in the more conventional SCR inverter circuit, thus eliminating a large, expensive, loss-type component. No magnetic shunt is employed in this transformer construction, as is typical of most such devices, thus eliminating another major source of cost, weight, and power loss in the form of heat.

Having established this L parameter by construction, the calculation of the values of C1 and C2 is a function of fundamental frequency of operation in a basic constant-K, pi-section, low-pass filter C1 and L must, of course, be adequate to commutate the SCR's. C2 may be matched to C1 by varying the primary to secondary turns ratio of T2. This match must be accomplished through consideration of the paralleling effect of $R_L$ in relationship to $X_C2$ at full load and may be readily effected through use of a secondary tap and the inherent impedance multiplication, i.e., $$\left(\frac{N_2}{N_1}\right)^2 = \frac{Z_2}{Z_1}$$

The degradation of $X_{C2}$ at full load by $R_L$ should not exceed 25% or the output waveform will deteriorate. For any practical frequency and load there is an economic compromise involved in this selection of tap ratio and C2. Again, a separate, and leakage isolated secondary coil may be employed to match C2, resulting in slightly greater isolation and an increase in short circuit capacity. The T2 configuration would then show three coils, as in FIG. 5.

The $Z_1/Z_2$ relationship inherently important to a constant-K filter is maintainned through application of the voltage sensing-voltage/current transfer feedback loop shown in FIG. 1.

*Operation*

In the operation of the apparatus (FIG. 1) input signal power applied across the terminals 10, 11 of the input component I will trigger the gates SCR1 and SCR2 alternately, thus supplying DC power to the gates SCR3 and SCR4 of the inverter-filter unit II. The operation of the input gates SCR1 and SCR2 is under control of the feedback control units III and IV, applied through the feedback conductor 20 and through the feedback resistors R20 and R21 to vary the bias on the gates SCR1 and SCR2 as applied to the gate cathode junctions, in accordance with customary biasing techniques. The 240 v. AC input power applied to transformer T1 will develop a sinusoidal output voltage in the secondary of transformer T1 across its output terminals 12, 13, and this output voltage, applied to the diodes SCR1 and SCR2, results in a full wave rectified output which is controlled by the feedback circuit 20 as to the timing of the intervals of conduction through the diodes SCR1 and SCR2 functioning as gates. More specifically, the control action affects the timing of the conduction intervals with reference to the half cycles of output of transformer T1. For example, if a timing pulse arrives at one of the rectified diodes at a point corresponding to the beginning of the half cycle of transformer output to be passed by that diode, substantially the complete cycle of transformer output will be conducted to the filter transformer unit II. On the other hand, if the control pulse arrives at the rectifier diode at a point half way beween the beginning and end of the respective half cycle of transformer output, only half of the output cycle will be conducted and only approximately half of the output voltage will be utilized in the development of input current for the inverter-filter tansformer T2. Consequently, the output voltage developed at the load $R_L$ will be only about half of the available capacity of the apparatus.

The DC pulses which are thus conducted by the SCR1 and SCR2 components, acting as gates, is delivered to the choke-input filter comprising capacitor C3 and inductance L1, which develops a relatively pure DC voltage for application to the primary of transformer T2 in the inverter-filter component II. At this point it should be noted that there is no synchronized relationship existing between the timing of the pulses delivered from the input component I to the input side of inverter-filter component II, since an important characteristic of the invention is the ability to utilize any selected frequency for the output delivered to load $R_L$, and to vary this frequency at will, irrespective of the frequency of the input to the input component I. Accordingly, the DC voltage stored in the filter C3, L1 is utilized by the inverter-filter component II at the selected load output frequency and is conducted through the gates SCR3 and SCR4 alternately under the control of an input signal delivered to the input terminals 33, 34 of the signal-isolation transformer T5, and from the dual secondaries 32, 32' thereof to the control terminals of the SCR3 and SCR4 gates, which utilize respective half cycles of the output of transformer of T5 to actuate these gates in 180° phase relation.

Any suitable known adjustable-frequency source of signal power can be utilized to feed the input of transformer T5, thus providing for adjusting the frequency of gating action on the input side of transformer T2 of inverter-filter component II.

The inverter-filter component II, operating with its pi-filter characteristics as hereinbefore described, will convert the pulses of DC input fed alternately to the respective sides of its primary on opposite sides of its center tap 24, to develop in the secondary across output terminals 26, 27 the characteristic sinusoidal output referred to above. Since this output is delivered directly off the secondary of transformer T2, without the necessity for utilizing additional filter circuits to convert a square waveform into a sinusoidal waveform, there is relatively little power loss in the output delivery, and the circuit on the output side of the inverter transformer T2 is a relatively simple one, requiring no heavy components other than transformer T2.

Before proceeding to the feedback operation it may be noted that capacitor C1 across the primary of transformer T2 executes a conventional commutating action in turning off the gates SCR3 and SCR4 alternately at the ends of their respective conduction, in order to avoid overlapping of the "on" periods of the two gates. The turning off of each gate is responsive to the turning on of the opposite gate which in turn is responsive to the signals transmitted from transformer T5.

A feedback signal is taken from the output across load $R_L$ by conductors 35 through bridge rectifier T3, CR4. A feedback voltage, stepped down through transformer T3 as to absolute value but proportional to the output voltage $R_L$, is delivered by conductors 40, 42 to the divider network R1, R2, R3 to adjust the bias on transistor Q1 in connection with the bias network comprising Zener diode CR3, resistor R4 and connecting conductor 43. The conduction of transistor Q1 in response to its bias as thus controlled by the feedback through bridge rectifier T3, CR4, is transmitted through its collector circuit including conductor 45, to the emitter of the unijunction transistor Q2 of transfer component IV. Thus, the bias on unijunction Q2 is adjusted in accordance with changes in the output voltage of the inverter-filter component II. As previously stated, the Zener diode CR3 provides a fixed reference bias on the emitter of transistor Q1.

Transfer circuit IV is powered by the full wave rectifier voltage delivered through transformer T4 the primary of which receives its power from the 240 v. AC source for the input transformer T1. The full wave half-cycle output of rectifier CR4, indicated at 55, is therefore in synchronously timed relation (i.e. as to repetition intervals) to the full wave half-cycle output delivered to the input transformer T1. However, transformer T4 is of relatively low VA rating as compared to power transformer T1, and its signal output wave 55 correspondingly of low power. A basic time constant for the firing of unijunction Q2 is established by the RC network comprising resistor R7 and capacitor C5 in series across the output connections 51, 52 from full wave rectifier CR5, this basic time constant determining the earliest firing interval under which firing of the unijunction Q2 can occur approximately at the beginnings of the half cycles of signal wave 55. Retardation of the firing point of unijunction Q2 is effected in response to adjustments in the bias on the unijunction Q2. For example, as the output voltage at load $R_L$ increases, the corresponding increase in the stepped down feedback signal output of feedback component III will adjust the bias on unijunction Q2 so as to retard the firing of the unijunction in reference to the then-occurring half cycle of the signal wave 55. More specifically, the retardation will be evidenced as a firing at a point on a half cycle of signal wave 55 somewhere between the beginning and end of that half cycle.

This is a form of phase-gating which is utilized in the control of the SCR1 and SCR2 diodes of input component I, acting as control gates, the opening of those gates occurring simultaneously with the firing of unijunction Q2 and therefore occurring at retarded points along the respective half cycles of output of power transformer T1 corresponding exactly to the retarded points on the signal wave 55 at which the firing occurs.

The invention provides a circuit, especially the inverter-filter component thereof, which is capable of efficient operation from 10 c.p.s. (cycles per second) to 5,000 c.p.s. within a range of 50 watts to 75,000 watts of power output, within established design goals. Weight per kilowatt in the 60 c.p.s.–400 c.p.s. conversion range can be reduced to approximately 50 pounds, which is no more than half the weight of known competitive devices of like performance, and is much smaller in size.

I claim:
1. An electric power converter comprising:
   a power input component having phase-controlled gating means for transmitting a succession of DC output pulses;
   an inverter component including means to receive said DC pulses and to transmit the same as a sinusoidal alternating current output, and gating means for controlling the reception of said pulses;
   a feedback component sensing the voltage of the power output of said inverter component and delivering feedback signals varying in accordance with the variations of power output sensed by said feedback component; and
   a transfer component including means for generating a succession of half cycles of control voltage having repetition intervals synchronized to those of said power input component, means responsive to said control voltage for delivering a succession of control pulses to said power input component for controlling the action of its said gating means and means responsive to the feedback signals delivered by said feedback component for variably timing the conduction intervals of said control pulses so as to correspondingly time the gating action in said power input component in a manner to vary the power magnitude of the said DC pulses transmitted by said power input component to said inverter component, whereby to vary the power magnitude of the output of said inverter component; said inverter component comprising a transformer including primary and secondary windings, a primary capacitor connected across the terminals of said primary winding, and a secondary capacitor connected across the terminals of said secondary winding, said transformer having a leakage inductance between said windings such as to constitute, with said capacitors, an equivalent pi-type filter embodied integrally within said transformer and capacitors, such as to provide highly efficient square wave to sine wave conversion combined with minimal weight in said inverter component.

2. An electric power converter comprising:

a power input component having phase-controlled gating means for transmitting respective half-cycles of DC output in alternating succession;

an inverter-filter component including means to receive said DC output and to transmit the same as a sinusoidal alternating current output, and frequency-controlled gating means for controlling the reception of said DC output of the power input component;

a feedback component sensing the magnitude of the power output of said inverter-filter component and delivering feedback signals varying in accordance with the variations of power output sensed by said feedback component;

a transfer component including means for generating a succession of half cycles of control voltage having repetition intervals synchronized to those of said power input component, means responsive to said control voltage for delivering a succession of control pulses to said power input component for controlling the action of its said gating means, and means responsive to the feedback signals delivered by said feedback component for variably timing the conduction intervals of said control pulses so as to correspondingly time the gating action in a manner to vary the power magnitude of the said half cycles of DC output transmitted by said power input component to said inverter-filter component, whereby to vary the power magnitude of the output of said inverter-filter component; and means for varying the frequency of gating action in said inverter filter component so as to vary the output frequency of said inverter; said inverter component comprising a transformer including primary and secondary windings, a primary capacitor connected across the terminals of said primary winding, and a secondary capacitor connected across the terminals of said secondary winding, said transformer having a leakage inductance between said windings such as to constitute, with said capacitors, an equivalent pi-type filter embodied integrally within said transformer and capacitors, such as to provide highly efficient square wave to sine wave conversion combined with minimal weight in said inverter component.

3. A converter as defined in claim 2, wherein said transformer is of a divided-primary type and its gating means comprises a pair of gates for transmitting energizing voltages alternately to the respective sides of said primary under the control of said frequency-varying means.

References Cited

UNITED STATES PATENTS

| | | | |
|---|---|---|---|
| 3,061,769 | 10/1962 | Smyth | 321—16 |
| 3,076,925 | 2/1963 | Jackson | 321—16 |
| 3,088,065 | 4/1963 | Manteuffel | 321—2 |
| 3,146,392 | 9/1964 | Sylvan | 323—22 |
| 3,205,424 | 9/1965 | Bates | 321—18 |
| 3,211,985 | 10/1965 | Torok | 321—18 |
| 3,210,638 | 10/1965 | Walker | 321—18 |
| 3,237,081 | 2/1966 | Martin | 321—18 |
| 3,249,844 | 5/1966 | Jensen | 321—44 |
| 3,260,919 | 7/1966 | Kleiner | 321—18 |
| 3,263,157 | 7/1966 | Klein | 323—22 |

JOHN F. COUCH, *Primary Examiner.*

M. L. WACHTELL, *Assistant Examiner.*